Reissued Nov. 11, 1930

Re. 17,867

UNITED STATES PATENT OFFICE

MARC DARRIN, OF PITTSBURGH, PENNSYLVANIA, ASSIGNOR TO F. N. BURT COMPANY LIMITED, OF TORONTO, CANADA, A CORPORATION OF ONTARIO, CANADA

COMPOSITION OF MATTER AND PROCESS OF FORMING SAME

No Drawing. Original application filed June 10, 1924, Serial No. 719,059. Renewed March 11, 1927. Original No. 1,644,711, dated October 11, 1927. Application for reissue filed December 21, 1929. Serial No. 415,819.

This invention relates to a composition of matter and a method of manufacturing the same.

An object of this invention is to provide a composition of matter and articles made from the same which will be strong, durable and rigid and will resist water and many chemical reactions, and will be capable of easy fabrication into useful articles.

A more specific object is to provide a process by which an article may be formed of a material capable of easy fabrication, such as paper pulp, but so associated or combined with a resistant substance, such as sulphur, that a hard, rigid, resistant article is obtained, capable of being machined or otherwise manipulated.

The invention accordingly comprises the several steps and the relation and order of one or more of such steps with respect to each of the others, and the article possessing the features, properties, and the relation of elements, which are exemplified in the following detailed disclosure, and the scope of the application of which will be indicated in the claims.

For a fuller understanding of the nature and objects of this invention, reference should be had to the following detailed description:

In accordance with this invention, it has been discovered that certain substances such as sulphur are capable of imparting to substances which would otherwise be of a porous nature, a remarkable degree of hardness and rigidity and impermeability, while at the same time making them resistant and capable of ready manipulation as by machining; more specifically when a fibrous material, such as cellulose, is combined, associated or impregnated with sulphur, a desirable composition is obtained. The proportion of sulphur contained in the product may be from 65% to 80% in the case of fully impregnated articles, and correspondingly less in the case of partially impregnated or surface hardened products, the greater part, if not all, of the remainder being fibrous material. The percentages above suggested are particularly illustrative of the application of the process to more porous substances, and it will be understood that the ultimate amount of sulphur in the product will vary with the porousness of the material impregnated.

For the purpose of causing a thorough mingling with the fibrous material there may be added to the sulphur in the fluid state any one of a variety of substances which are capable of forming with the sulphur a composition which will thoroughly wet the fibers.

These porous substances have voids or interstices within and between the fibres or particles, and these voids or interstices are herein generally designated as pores.

Within the broader aspects of this invention, the composition may be formed by incorporating the fiber with the sulphur and the introfier in any suitable manner, as for example, dry paper fiber may be mixed with sulphur and an introfier and the resultant mass may be molded under heat and pressure.

For many purposes, however, it is prefered to first fabricate the article from the fibre, as for example, from blown pulp or paper board and subsequently to impregnate it by immersion in the impregnating compound.

Melted sulphur does not ordinarily possess the property of wetting pulp or penetrating into the fibers, and satisfactory results have not been obtained by the use of solutions of sulphur in the customary solvents.

In accordance with this invention, it has been discovered that a certain class of substances possess the property when added to melted sulphur of reducing the viscosity, causing the solution readily to wet the pulp and increasing the penetrating power. These substances will be herein termed introfiers.

Naphthalene and its derivatives form excellent introfiers and satisfactory results have been obtained with other substances in which the molecule contains a plurality of cyclic nuclei, as for example, diphenyl, diphenyl methane, benzyl ether, dibenzyl ketone, fluorene, carbazol, naphthalene, naphtholes, naphthylamines, tetrahydronaphthalenes, monochloronaphthalenes, dichloronaphthalenes, trichloronaphthalenes, tetrachloronaphthalenes, pentachloronaphthalenes and quinoline.

Substances having more than two cyclic nuclei, for example, anthracene, triphenyl methane and triphenylphosphate, possess the property of introfiers, although they are more difficultly soluble in melted sulphur. Triphenyl phosphate in particular is powerful and while comparatively inexpensive, it produces excellent results.

In many cases the amount of introfier is limited by its solubility in melted sulphur. Naphthalene is quite soluble and can be used in almost any amount desired. As a rule it is not desirable to employ over 10% of this material. Some of the other introfiers which are less soluble such as anthracene and carbazol, are, however, more powerful introfiers per unit weight of material used,—very appreciable penetration being obtained with less than one per cent. The speed of penetration is greater with large amounts of very soluble introfiers such as naphthalene and diphenyl, than with small amounts of more powerful introfiers. The latter have the advantage of being practically odorless and nonvolatile.

The invention makes it possible to thoroughly impregnate the cellulose. Without the use of an introfier the sulphur penetration does not approach the point of complete impregnation and the resultant product is not impervious, probably by reason of the small unfilled air spaces therein. With the more dense forms of cellulose without an introfier the sulphur penetration is correspondingly small.

The superior impenetrability produced by this invention is in part due to the difference in crystalline form of the resulting structure. When sulfur is cooled from the liquid state under ordinary conditions, it crystallizes in a monoclinic form. This system is not stable at room temperatures and is gradually converted into the rhombic form with a shrinkage in volume. When the monoclinic crystals are held in place by a firm matrix such as fibre board or wood, the change in crystallization results in a shrinkage of the crystals away from each other leaving interstices between the crystals. So that even if the mass be impenetrable at the time of cooling, it does not so remain after the change in crystal system.

Where this invention is employed, however, the crystallization is altered and the rhombic crystals form directly from the liquid phase, and form contiguous to each other, that is without any interstices between them.

By way of illustration, the following method can be used for impregnating blown pulp articles: First, sulphur may be melted in a kettle or otherwise at a temperature of approximately 130° C. Thereupon there may be added, for example, 5% of naphthalene, and the heat may be continued until a homogeneous solution results. It is preferable to effect this solution between the temperatures of 120° and 130° C.

The penetration is most satisfactory when the article is free from moisture and when it contains a minimum of entrained air. For some purposes, therefore, it may be desirable to perform a separate preliminary step of preheating the article before immersing it in the sulphur bath. In some cases, however, it will be found that such a separate step is not required since the temperature of the impregnating bath itself is sufficient to accomplish the result. Obviously, however, the speed of penetration will be greater where the moisture is already removed. In either case it will be found that the fibers of the article will be thoroughly wetted with the sulphur and in the course of a short time a thorough impregnation will result. For small articles this result can be accomplished in fifteen minutes, or less. It varies somewhat with the character of the article, the quantity of the introfier used in the bath, and with the temperature of impregnation. The greatest speed of penetration apparently occurs in the temperature of greatest fluidity of melted sulphur between 120° and 125° C., but for many purposes, it is desirable to effect the impregnation at a slightly higher temperature, as for example, 130° to 135° C.

The use of the slightly higher temperature assists in bringing up the temperature of the immersed article, and assists in producing a clean impregnated article free from drippings or excess sulphur on the surface.

The explanation of this fact appears to be as follows: As the article cools after removal from the bath, it passes through a temperature of maximum penetration, causing any excess sulphur clinging to the surface to be absorbed into the interior of the article.

If the impregnation be carried on at a lower temperature, it is desirable to raise the temperature to 130° or 135° just prior to or after removal from the bath. In this manner the penetration occurs at the temperature most desirable for that step, while the article upon removal is, or is brought to, a temperature higher than that of maximum penetration.

Should it be desired to produce but partial impregnation or surface hardening, this may be accomplished by spraying with an impregnating material or by dipping the article in the impregnating bath and withdrawing before appreciable penetration has occurred. The article may then be heated in an oven at from 125° to 145° C., whereupon the adhering sulphur film will penetrate it.

By the processes herein outlined, articles may be caused to take up a large quantity of sulphur, as for example a blown pulp article may be brought to three to five times its original weight by the impregnation. Immediately after the removal of the pulp articles from the bath, they may be cut, or otherwise shaped like hard cheese, but thereafter they become hard, strong and rigid, they can be easily machined and take a high natural polish, and are non-conductors of electricity. The natural color of the product varies from almost white through a buff color to brown, depending on the quality of the ingredients and the temperature to which they are subjected. This may be varied as desired by the use of suitable coloring substances.

Since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the general and specific features of the invention herein described, and all statements of the scope of the invention, which, as a matter of language, might be said to fall therebetween.

Having described my invention what I claim as new and desire to secure by Letters Patent, is:

1. A composition of matter comprising chiefly sulphur and having a smaller quantity of cellulose therein and possessing the properties of hardness, strength, impermeability and resistivity, being a non-conductor of electricity and capable of being machined.

2. A composition of matter comprising approximately from 20% to 35% cellulose, the remainder being chiefly sulphur, and possessing the properties of hardness, strength, impermeability and resistivity, being a non-conductor of electricity and capable of being machined.

3. A composition of matter comprising approximately from 20% to 35% cellulose, the remainder being chiefly sulphur and containing an introfier, the composition possessing properties of hardness and strength, impermeability and resistivity, being a non-conductor of electricity and capable of being machined.

4. The process of impregnating which comprises subjecting a porous article to the action of molten sulphur at atmospheric pressure and removing the article while at a temperature slightly in excess of the temperature of maximum fluidity of the sulphur without altering the pressure whereby the excess sulphur adhering to the surface upon removal is absorbed into the fibres.

5. The process of treating a paper article which comprises subjecting it to the action of a composition of sulphur and an introfier at a temperature higher than that of maximum fluidity of the composition.

6. The process of treating paper which consists in permeating the same with a composition of sulphur and naphthalene.

7. The process of treating paper which consists in permeating the same with a composition of sulphur and an introfier.

8. The process of treating a blown pulp article which comprises immersing the same in a bath of fluid sulphur and an introfier.

9. The process of treating a blown pulp article which comprises immersing the same in a bath of fluid sulphur and an introfier at a temperature above that of maximum penetration.

10. An article of manufacture comprising a blown pulp article impregnated with sulphur and an introfier.

11. The process of impregnating porous cellulose with sulphur, which comprises subjecting the cellulose to the action of molten sulphur in the presence of an introfier at a temperature below the temperature of deterioration of the cellulose.

12. The process of treating a cellulose which comprises immersing the same in a composition of sulphur and an introfier at a temperature above that of maximum fluidity of the sulphur.

13. A composition of matter comprising porous cellulose fully impregnated with sulphur in a stable, impermeable form possessing properties of hardness, strength, and resistivity, being a non-conductor of electricity.

14. A composition of matter comprising cellulose impregnated with a mixture of sulphur and a small percentage of an introfier to the point of impermeability and possessing the properties of hardness, strength, and resistivity, being a non-conductor of electricity.

15. A process of impregnating porous cellulose which comprises immersing the same in a bath of fluid sulphur and an introfier at a temperature below that of deterioration of the cellulose.

16. A composition of matter comprising a porous substance fully impregnated with sulphur in a stable, impermeable form possessing properties of hardness, strength, and resistivity, being a non-conductor of electricity.

17. A composition of matter comprising a porous substance impregnated with a mixture of sulphur and a small percentage of an introfier to the point of impermeability and possessing the properties of hardness, strength, and resistivity, being a non-conductor of electricity.

18. A substance of the character described comprising a continuous porous material having its pores completely filled with a substance containing free sulphur and having the physical characteristics of free sulphur and crystallized into contiguous cohering rhombic crystals forming a durable, impermeable mass.

19. The process of rendering a porous substance impermeable which comprises filling its pores with a liquid impregnant containing free sulphur and having the physical characteristics of free sulphur and congealing the sulphur direct from the liquid phase into contiguous stable crystals without interstices between them.

In testimony whereof I affix my signature.

MARC DARRIN.